United States Patent
Shumate et al.

(10) Patent No.: US 8,335,256 B2
(45) Date of Patent: Dec. 18, 2012

(54) MOTION COMPENSATION IN VIDEO CODING

(75) Inventors: John Shumate, Encinitas, CA (US); Yendo Hu, La Jolla, CA (US)

(73) Assignee: General Instrument Corporation, Horsham, PA (US)

( * ) Notice: Subject to any disclaimer, the term of this patent is extended or adjusted under 35 U.S.C. 154(b) by 975 days.

(21) Appl. No.: 12/271,443

(22) Filed: Nov. 14, 2008

(65) Prior Publication Data

US 2010/0124278 A1    May 20, 2010

(51) Int. Cl.
H04N 11/02    (2006.01)

(52) U.S. Cl. .................................................. 375/240.16

(58) Field of Classification Search .................. None
See application file for complete search history.

(56) References Cited

U.S. PATENT DOCUMENTS

| | | | |
|---|---|---|---|
| 5,111,415 A | 5/1992 | Shackleford | |
| 5,751,233 A | 5/1998 | Tateno et al. | |
| 5,798,953 A | 8/1998 | Lozano | |
| 5,951,677 A | 9/1999 | Wolf et al. | |
| 6,058,213 A | 5/2000 | Cho | |
| 6,349,379 B2 | 2/2002 | Gibson et al. | |
| 6,519,287 B1 * | 2/2003 | Hawkins et al. | 375/240.16 |
| 6,970,114 B2 | 11/2005 | Lovell | |
| 7,286,066 B1 | 10/2007 | Ho et al. | |
| 7,324,593 B2 * | 1/2008 | Boon et al. | 375/240.01 |
| 7,397,402 B1 | 7/2008 | Hu | |
| 7,822,120 B2 * | 10/2010 | Kondo et al. | 375/240.16 |
| 7,864,858 B2 * | 1/2011 | Simpson et al. | 375/240.16 |
| 7,881,375 B2 * | 2/2011 | Abe et al. | 375/240.12 |
| 2003/0142874 A1 | 7/2003 | Schwartz | |
| 2003/0189571 A1 | 10/2003 | MacInnis et al. | |
| 2005/0012759 A1 | 1/2005 | Valmiki et al. | |
| 2005/0066150 A1 | 3/2005 | Mehta | |
| 2005/0259736 A1 | 11/2005 | Payson | |
| 2006/0008007 A1 * | 1/2006 | Olivier et al. | 375/240.16 |
| 2006/0114985 A1 | 6/2006 | Linzer | |
| 2006/0159181 A1 | 7/2006 | Park et al. | |
| 2006/0256856 A1 | 11/2006 | Koul et al. | |
| 2006/0256869 A1 | 11/2006 | Chin | |
| 2007/0230573 A1 * | 10/2007 | Iguchi et al. | 375/240.12 |
| 2008/0025412 A1 * | 1/2008 | Lee et al. | 375/240.25 |

(Continued)

OTHER PUBLICATIONS

Stallings, "Operating Systems: Internals and Design Principles", 1998, Prentice-Hall, $3^{rd}$ Edition, pp. 21-27.*

(Continued)

*Primary Examiner* — Minh Dinh
(74) *Attorney, Agent, or Firm* — Stewart M. Wiener (57) ABSTRACT

A video coding system includes a decoder configured to decode an encoded reference picture, a primary memory, and a secondary memory configured to store the decoded reference picture. The video coding system also includes a logic device configured to extract motion vectors for generating a predicted picture of the reference picture and to store the extracted motion vectors in memory bins. The reference picture includes a plurality of predefined regions and each memory bin stores motion vectors for a particular region of the plurality of predefined regions. For each of the plurality of predefined regions of the reference picture, the logic device is configured to use the memory bin corresponding to a reference region to read the reference region from the secondary memory and write the reference region into the primary memory. The written reference region and the motion vectors of the corresponding memory bin are used to spatially translate the written reference region into the predicted picture.

16 Claims, 3 Drawing Sheets

U.S. PATENT DOCUMENTS

| | | | |
|---|---|---|---|
| 2008/0043843 A1* | 2/2008 | Nakaishi | 375/240.16 |
| 2008/0111722 A1 | 5/2008 | Reznik | |
| 2008/0122662 A1 | 5/2008 | Hu | |
| 2008/0137726 A1 | 6/2008 | Chatterjee et al. | |
| 2008/0219349 A1 | 9/2008 | Huang et al. | |
| 2008/0247459 A1 | 10/2008 | Hu | |
| 2008/0276078 A1 | 11/2008 | Hu | |
| 2011/0019737 A1 | 1/2011 | Yang et al. | |
| 2011/0200308 A1 | 8/2011 | Tu et al. | |
| 2011/0280306 A1 | 11/2011 | Zheludkov et al. | |

OTHER PUBLICATIONS

Sullivan, et al, ISO/IEC 14496-10 Advanced Video Coding 3rd Edition, ISO/IEC JTC 1/SC29/WG11, N6540, Redmond (USA), Jul. 2004.

Schmookler, et al, "Leading Zero Anticipation and Detection—A Comparison of Methods", IEEE Proceedings, 15th Symposium on Computer Arithmetic (ARITH15) 2001.

ITU-T Recommendation H.264 (Mar. 2005), "Advanced Video Coding for Generic Audiovisual Services", International Telecommunication Union, Mar. 2005.

Moffat, et al, "Arithmetic Coding Revisited", ACM Transactions on Information Systems, Vo. 16, No. 3, Jul. 1998. pp. 256-294.

Osorio, et al, "Arithmetic Coding Architecture for H.264/AVC CABAC Compression System", in Proceedings of 2004 Euromicro Symposium on Digital Systems Design (DSD 2004), Architectures, Methods and Tools, Aug. 31-Sep. 3, 2004, Rennes, France, IEEE Computer Society 2-4; pp. 62-69.

Seitner, et al, "A Macroblock-level Analysis on the Dynamic Behaviour of an H.264 Decoder", IEEE ISCE 2007, Dallas, Texas, USA, Jun. 2007.

PCT International Search Report & Written Opinion, Re: Application # PCT/US07/83412: May 15, 2008.

* cited by examiner

MOTION COMPENSATION IN VIDEO CODING

BACKGROUND

Subscribers of digital services increasingly desire service of video in high definition. High definition video requires more bits than standard definition because 1) bits represent a pixel, 2) a digital picture represents a matrix of pixels and 3) a digital picture has more pixels in high definition than standard definition. In addition, 4) high definition video represents a stream of digital pictures and 5) a stream of digital pictures in high definition may, for example, comprise twice as many digital pictures, per second, than a stream of digital pictures in standard definition.

Digital service providers desire to service subscribers with high definition programming. Typically, digital service providers transmit according to established standards. However, established standards require increased memory power for processing the additional digital bits needed for high definition. For example, encoders at a local cable head-end, local IPTV head-end (Internet Protocol Television), any other local head-end, or somewhere upstream of any local head-end require substantial amounts of fast memory to encode HDTV for distribution to subscribers.

Typically, digital service providers transmit with increased memory power by using memory that is more expensive such as memory in FPGAs (field programmable gate arrays). Using memory that is more expensive however increases the cost of doing business, which may be passed on to subscribers. In addition, digital service providers compete on an economy of scale basis. Consequently, increasing memory power using memory that is more expensive impedes the growth of business and fails to meet the needs of more subscribers because, for example, fewer subscribers may be willing or able to afford high definition. Thus, digital service providers desire to increase the number of subscribers in total, for example, to minimize increased cost to each subscriber by distributing the increased cost among more subscribers.

Therefore, it would be beneficial to digital service providers to 1) service more subscribers 2) with high definition service 3) of additional channels 4) at a lower cost to each subscriber 5) by minimizing the use of memory that is more expensive in favor of an alternative.

BRIEF DESCRIPTION OF THE DRAWINGS

Features of the present invention will become apparent to those skilled in the art from the following description with reference to the figures, in which.

DETAILED DESCRIPTION OF THE INVENTION

For simplicity and illustrative purposes, the present invention is described by referring mainly to exemplary embodiments thereof. In the following description, numerous specific details are set forth to provide a thorough understanding of the present invention. However, it will be apparent to one of ordinary skill in the art that the present invention may be practiced without limitation to these specific details. In other instances, well known methods and structures have not been described in detail to avoid unnecessarily obscuring the present invention.

Embodiments of the present invention include reordering video data to use memory that is less expensive for servicing subscribers with digital video. Embodiments of the present invention include 1) extracting motion vectors from a sequence of encoded pictures (i.e., from a video stream); 2) sorting the extracted motion vectors into a different order than raster scan order (i.e., in a different order than from left to right and top to bottom); 3) storing reference pictures in less capable memory to permit lower rates of memory accesses per second for less computationally intense operations as described herein, the reference picture comprising a plurality of predefined regions; and 4) for each of the plurality of predefined regions of the reference picture, using motion vectors stored in a corresponding memory bin to read a reference region from the less capable memory and write the reference region into the more capable memory for performing more computationally intense operations to spatially translate the reference region into predicted video data, wherein the more capable memory is used for higher rates of memory accesses per second when spatially translating the reference picture in a manner described herein. Spatially translating includes the process of mapping a pixel or a portion of a pixel (e.g., quarter-pixel resolution) from a reference picture to a (partial or full) predicted picture.

Spatially translating reference video data into predicted video data is computationally intense and requires fast bandwidth memory. Spatially translating reference video data into predicted video data in the conventional (raster scan) order requires more fast bandwidth memory than embodiments of the present invention. Particularly, spatially translating reference video data into predicted video data according to reference region (instead of raster scan order) requires less fast bandwidth memory, as described herein by way of example. In this regard, embodiments of the present invention include a redistribution of the rate of memory accesses away from a uniform distribution (among only fast bandwidth memory) and towards a non-uniform distribution (among both fast and slow bandwidth memory) by spatially translating according to regions of the reference picture instead of raster scan order. For instance, instead of using 1) only fast bandwidth memory to perform all memory accesses in raster scan order (in the spatial translation of a reference picture into a predicted picture), by spatially translating according to region (instead of raster scan order) memory accesses can be distributed among both 1) fast bandwidth memory and 2) slow bandwidth memory. While a similar amount of high-rate memory accesses is needed to translate a reference picture into a predicted picture in either raster scan order or reference region order, translation in the order of reference regions enables a temporal concentration of high-rate memory accesses for each reference region. This temporal concentration of high-rate memory access in turn enables the use of slow memory bandwidth memory for other memory accesses. For example, a reference picture is first stored in slow bandwidth memory. The reference picture is divided into regions. A region of the reference picture (i.e., a reference region) is read from the slow bandwidth memory and written into the fast bandwidth memory. The fast bandwidth memory can be used to increase the rate of memory accesses needed to spatially translate the reference region into predicted video data. In the meantime, however, the fast bandwidth memory is not needed to store the remainder of the reference picture. In this regard, the slow bandwidth memory is adequate for storing the remainder of the reference thereby enabling the use of less expensive memory instead of more expensive memory for storing the remainder of the reference picture.

Consider digital video encoding and digital video decoding. Typically, encoding includes 1) motion estimation and 2) motion compensation. In comparison, decoding typically includes 1) motion compensation. In contrast, however, decoding typically does not include 2) motion estimation, as will be described herein by way of example.

A video encoder uses motion estimation to determine and encode motion between a current picture and one or more reference pictures. Typically, current refers to a picture currently being encoded (for example, encoded according to well-known video coding/compression standards such as MPEG 2, MPEG 4 Part 10, H.264, etc). Because a typical sequence of digital pictures includes redundant information from one digital picture to another digital picture (by the very nature of digital video), the sequence of digital pictures can be compressed by minimizing the redundant information. Motion estimation is used as part of the compression of a sequence of digital pictures. For example, motion estimation is used so the sequence of digital pictures can be transmitted through a limited bandwidth channel and/or stored so as to occupy less memory in total). In motion estimation, the inputs are 1) a current picture and 2) one or more reference pictures. The output of motion estimation is 3) motion vectors.

Motion compensation is the process of generating a (partial or full) predicted picture that represents a prediction of the current picture (from which the motion vectors were determined in the preceding process of motion estimation.) In motion compensation, the inputs are 1) the motion vectors and 2) one or more reference pictures. The output of motion compensation is 3) the (partial or full) predicted picture. (One of ordinary skill in the art will recognize that a partial or full predicted picture is not normally viewable.)

As described, the predicted picture is a prediction of the current picture which was used to determine the motion vectors during motion estimation. The predicted picture (determined from the current picture) is subtracted from the current picture itself. The result is a residual picture (i.e., the difference between the prediction of the current picture and the current picture itself is the residual picture.) The residual picture is DCT-coded (Discrete Cosine Transform coded) and entropy-coded. In this regard, video encoding of the current picture is the encoding of the motion vectors (representing a prediction of the current picture) plus the (DCT and entropy) encoded residual picture.

The decoding process is similar to the process of motion compensation, except that it is not immediately preceded by motion estimation since the motion vectors have already been generated at the encoder and sent to the decoder. For example, the entire predicted picture is first generated (from the motion compensation process) before it is added to an inverse DCT residual picture to generate a subsequent picture. This subsequent picture is then filtered through a deblocking filter. The resulting picture is the current picture and can be displayed on a television (in the correct order). Optionally, the resulting picture may be stored as a potential reference picture.

Motion itself is change from one picture to another picture in a sequence of digital pictures. For example, consecutive digital video pictures in a sequence of pictures captured by a video camera may capture motion attributable to a variety of factors. Examples include 1) movement of a video camera itself, 2) panning with a video camera, 3) tilting of a camera and 4) any movement at all (of any one or more objects, graphics, animation, subtitles, and so forth, including inside or outside the optical field of a camera). Therefore, one or ordinary skill in the art will recognize that the present invention is applicable to any change from one picture to another.

A motion vector is used to characterize the movement between an independent picture and a dependent picture. For example, the motion vector is a 2-dimensional vector characterizing 1) the distance of change between a block of data in an independent picture and a block of data in a dependent picture and 2) the direction of that same change.

Coding typically refers to decoding and transcoding/transrating. However, the term may refer to either encoding, decoding or both. Thus, the video coding system 100 may encode and/or decode a video stream. Also, a coded stream may comprise an encoded video stream.

In a simplified example involving the compression of a 2-picture sequence of video for transmission to a subscriber for viewing, the 2-picture sequence is encoded, transmitted, decoded and viewed. After the entire first picture is encoded, it becomes possible to encode the difference between the first picture and the second picture instead of the entire second picture. Upon transmission and reception of the encoded 2-picture sequence, the first picture may be reproduced by decoding it alone. In this regard, the first picture is an independent picture. (The independent picture is sometimes called the intra-coded frame or I-frame.) In contrast, the second picture may be reproduced by combining 1) the reproduction of the first picture 2) motion vectors of the second picture that reference movement of blocks of pixels from the first picture to the second picture and 3) other video data representing the difference between the first picture and the predicted second picture. In this regard, the second picture depends upon the first picture and therefore may be referred to as a dependent picture. Because the first independent picture is usable to reproduce the second dependent picture, it is referred to as a reference picture. A dependent picture is also referred to as a predicted picture (also called an inter-coded frame.) The combination of 1) and 2) generate a predicted picture. The addition of 3) from the combination of 1) and 2) generates a reproduction of the second picture.

In an example of a (transparent depending) second picture being overlaid upon an (adjacent independent preceding) first picture in a 2-picture sequence, a motion vector may be illustrated graphically with an arrow having its end beginning from the left (on a block of pixels in the first picture) and pointing upward and to the right (wherein the arrows tip points to a matching block of pixels in the second picture). For instance, this distance between a first block of pixels in the first picture and a matching second block of pixels in the second picture may be spatially quantified in terms of pixels and/or partial pixels (for example, using 2-dimensional Cartesian coordinates and/or 2-dimensional polar coordinates). One of ordinary skill in the art would recognize that distances may be characterized in varying degrees of pixel resolution. In an example involving Cartesian coordinates, this distance of motion may be 3 pixels to the right and 4 pixels up. As another example, this distance may be 3.5 pixels to the right and 4.5 pixels up. In yet another example, this distance may be 3.75 pixels to the right and 4.75 pixels up.

In MPEG 2, predicted pictures are P-frames. In MPEG 4, predicted pictures include P-frames and may also include B-frames. A B-frame is a bi-directional predicted picture wherein motion vectors are used to point forward and backward in manner described herein. In MPEG 4, with reference to embodiments of the present invention, a first partial predicted picture is generated from motion vectors extracted from a first bi-directional picture. For instance, the motion vectors are extracted and sorted in a manner described herein and the first partial-predicted picture is generated therefrom in a manner described herein. In addition, a second partial predicted picture is generated from another bi-directional picture. The first and second partial predicted pictures are summed to generate the full predicted picture. The full predicted picture is stored in the predicted memory (for example, any memory such as the secondary memory 106). Alternatively, the first partial predicted picture may be generated and stored in any memory. The first partial predicted picture may be read from memory upon generation of the second partial predicted picture in a manner described herein. Upon reading the first partial predicted picture from memory, the first and second partial predicted pictures are summed.

Figure 1:
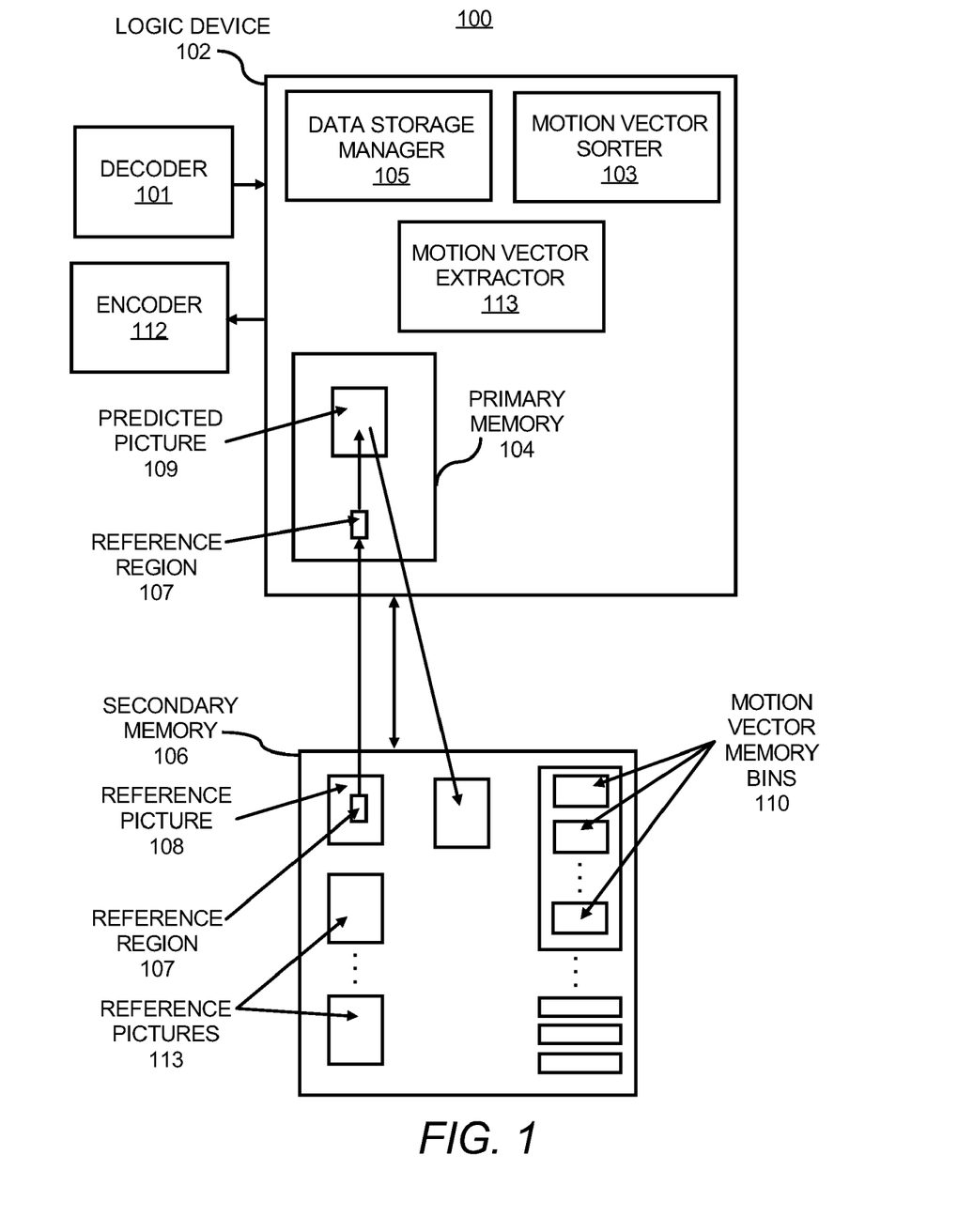
FIG. 1 illustrates a simplified block diagram 100 of a video coding system configured to extract motion vectors from a video stream and to sort the extracted motion vectors in a different order (i.e., region order) than conventional order (i.e., raster scan order) to generate (partial and/or full) predicted pictures from (one or more) reference pictures using a combination of 1) high bandwidth memory (i.e., to process reference regions of the reference picture in region order) and 2) low bandwidth memory (instead of only high bandwidth memory) and to perform other various functions described herein, according to an embodiment of the invention.

FIG. 1 illustrates a simplified block diagram of the video coding system 100 configured to perform various functions described herein, according to an embodiment of the invention. FIG. 1 illustrates the video system 100 as including a decoder 101, a logic device 102, a secondary memory 106, and an encoder 112. The logic device 102 includes a motion vector sorter 103, a primary memory 104, a data storage manager 105 and a motion vector extractor 113.

The decoder 101 and the encoder 112 are shown as being separate from the logic device 102. However, the logic device 102 may alternatively include the decoder 101, the encoder 112 or both. The logic device 102 is illustrated as one device by way of example. However, the logic device 102 may comprise multiple devices. As examples, the logic device 102 may comprise any combination of one or more FPGAs, DSPs (digital signal processors), and/or ASICs (application specific integrated circuits).

In one embodiment, the system 100 performs functions that requires decoding and encoding a received coded video stream. For example, the system 100 may perform transrating, which encompasses encoding the received stream at a different lower bit-rate. For example, the stream may need to be transmitted at a lower bit-rate because sufficient bandwidth may not be available to transmit the stream at its current bit-rate. The encoder, decoder and the logic device of the system 100 may be used to perform the decoding and encoding for transrating or for other purposes as described herein. For example, the encoder 112 may re-encode the pictures from a received video stream at a different lower bit-rate.

FIG. 1 illustrates the primary memory 104 includes a reference region 107 (a region of a reference picture as it is being written into the primary memory 104) and a predicted picture 109 (for instance, a dependent picture as described herein). The predicted picture 109 is stored in the secondary memory 106. However, the predicted picture 108 may be stored in the primary memory 104 and/or any other memory (shown or not shown in FIG. 1). FIG. 1 illustrates the secondary memory 106 including the same reference region 107 (as it is being read from the secondary memory 106), a reference picture 108 and, for example, future reference pictures 113 (used for the reproduction of other dependent pictures).

For example, the primary memory 104 is small, fast, memory on an FPGA, the DSP, and/or ASIC. Normally, once a predicted picture is generated it will be used to generate the final picture. The final is the reconstructed picture or decoded picture. Unless the predicted picture is needed for other uses, the decoded picture will either become a reference picture and/or will exit the primary memory and either be re-encoded or displayed on a television set. So normally, past predicted pictures are not stored in primary memory. An example, however, of another use is a pipelined architecture. A pipelined architecture is an architecture where the predicted picture is generated and used in the next process, for example, of generating the next predicted picture. Optionally, the primary memory 104 may be internal or external to the logic device(s) 102. In addition or alternatively, the primary memory 104 may comprise any suitable number and/or suitable type of memory, or memory combination as described herein (whether illustrated by way of example in FIG. 1 and its description, and/or other.)

The secondary memory 106 includes the reference region 107, a reference picture 108, motion vector memory bins 110 and the reference pictures 113. The reference picture 108 is divided into regions (which may or may not overlap.) Although the motion vector memory bins 110 and/or reference pictures 113 are illustrated as being stored in the secondary memory 106 by way of example, each of the motion vector memory bins 110 may be stored in any memory (whether illustrated in FIG. 1 or not). However, the secondary memory 106 is not the primary memory 104. For instance, the secondary memory 106 is capable of fewer memory accesses per second and may be less expensive than the primary memory 104. In a preferred embodiment, the secondary memory 106 is large compared to the primary memory 104. For instance, the secondary memory 106 may comprise any suitable number and/or suitable type of memory or memory combination (whether illustrated in FIG. 1 by way of example or not) which stores the reference pictures 113.

The motion vector memory bins 110 are for storing motion vectors which are extracted from an encoded dependent picture. The motion vectors are sorted in a different order than raster scan order as described herein before they are stored in the motion vector memory bins 110. The motion vector memory bins 110 are shown in FIG. 1 as separate boxes. Each box represents all of the motion vectors representing a corresponding region of a reference picture. For example, the reference region 107 has a corresponding motion vector memory bin (i.e., illustrated as a box) which stores motion vectors corresponding to the reference picture 108. The reference picture 108, is divided, for instance, into many regions including the reference region 107. Therefore, each memory bin 110 corresponds to a different one of the many regions of the reference picture 108. There is a same number of regions as there are motion vector bins 110) for each reference picture). The motion vector memory bins 110 may be stored in any memory, shown and/or not shown in FIG. 1, and therefore are only illustrated by way of example as being stored in either or both of 1) the primary memory 104 and 2) the secondary memory 106. The predicted picture 109 and the reference picture 108 are show the region-by-region coding process with respect to FIG. 2.

It will be apparent that the video coding system 100 may include additional elements not shown and that some of the elements described herein may be removed, substituted and/or modified without departing from the scope of the video coding system 100. It should also be apparent that one or more of the elements depicted in FIG. 1 may be optional.

The video coding system 100 receives a coded stream of digital pictures encoded in a well-known manner, for instance, at an encoded constant bit-rate or at an encoded capped constant bit-rate, or any combination. The coded stream is received at the decoder 101.

Well known digital standards define a convention for the organization of the motion vectors within an encoded picture. For instance, well known digital standards define the order of motion vectors in a picture by ordering the motion vectors in the same raster scan order that an analog television scans an image on a picture tube, from left to right and from top to bottom.

Consider the above example involving a 2-picture encoded sequence, where the first picture is the reference picture (e.g., the reference picture 108) and the second picture is the predicted picture (e.g., the predicted picture 109) represented at least in part by motion vectors. Upon receiving the coded stream of pictures at decoder 101, the motion vector extractor 113 extracts motion vectors from the predicted picture 109 in any order. Because the video coding system 100 extracts the motion vectors of the predicted picture 109 in any order, the data storage manager 105 may initially store the extracted motion vectors in any order and/or in any memory (or combination of memory).

The motion vector sorter 103 sorts the extracted motion vectors in a different order than a raster scan order. Upon sorting the motion vectors in a different order than raster scan order, the data storage manager 105, for example, stores the sorted motion vectors in sets. Each set of sorted motion vectors is stored in one of the motion vector memory bins 110, which may comprise locations in memory that can be accessed by addressing the particular locations. The extraction of the motion vectors in a different order than a raster scan order and the sorting and storing in the memory bins 110 may be included in a decoding process. Once the reference picture is fully decoded and the predicted picture is at least partially decoded (i.e., blocks of the predicted picture are estimated using the sorted motion vectors), then the reference and predicted pictures can be transrated.

FIG. 1 shows the memory bins 110 as being located in the primary memory 104 and the secondary memory 106. Note that the location of the motion vector memory bins 110 is optional and therefore may not be in either of the primary memory 104 or the secondary memory 106. Instead, for instance, the motion vector memory bins 110 may be in other memory (not shown).

The reference picture 108 is stored with the other reference pictures 113 in the secondary memory 106. The secondary memory 106 is typically less expensive memory than the primary memory 104 because the secondary memory 106 is less capable of as many memory accesses per second. An example type of memory (of the secondary memory 106) is DDR memory (double data rate memory).

Features of the present invention, include various embodiments in which the video coding system 100 may be employed to enable the video coding system 100 coding video using less expensive memory. Some or all of the features of the video coding system 100 and/or the steps of the method 300 and other steps described herein may be embodied as utilities, programs or subprograms, in any desired computer accessible medium, such as computer readable storage medium including memory or some other data storage device.

Exemplary computer readable storage devices that may be used to store software which can implement the present invention (when stored on the appropriate substantiate(s)) include but are not limited to conventional computer system DDR, RAM, ROM, EPROM and EEPROM. Concrete examples of the foregoing include distribution of the programs on a CD ROM or via Internet download. In a sense, the Internet itself is a computer readable medium. The same is true of computer networks in general. It is therefore to be understood that any electronic device and/or system capable of executing the functions of the above-described embodiments are encompassed by the present invention.

Examples of hardware in the video coding system 100 include one or more FPGAs, one or more DSPs, one or more ASIC, etc., or any combination. The reference picture 108 is a fully reproduced picture. For example, it is an image or frame that is displayed or can be displayed as is. The reference region 107 is one region of multiple regions of the reference picture 108, and multiple blocks may be in each region. A block may be defined by way of example as having a size of 16×16 pixels (256 pixels). One of ordinary skill in the art will recognize, however, that a block may have any suitable size and therefore the present invention is not limited to this example. In addition, a region may have multiple blocks. By way of example, a region may by 160×160 pixels (25600 pixels). In this example, a region may contain 100 blocks having 16×16 pixels (25600/256=100). However, one having ordinary skill in the art will recognize that a region may comprise any number of pixels and therefore the present invention is not limited to this example. In MPEG 4, for example, blocks may be variable sized. For example, in MPEG 4, the block size in motion estimation is variable and the DCT block size is also variable. In contrast, in MPEG 2, the DCT block size is 8×8 pixels. Also in contrast to MPEG 4, in MPEG 2 motion estimation the block size is 16×16 pixels, except when interlacing is used. When interlacing is used in MPEG 2, the block size in motion estimation is 16×8 pixels.

After the encoded video stream is received, and the motion vectors for each region are stored in a respective memory bin, the motion vectors are used to determine the range the addresses to read the entire region of video data from the secondary memory 106 to the primary memory 104. This is shown in FIG. 1 where the reference region 107 is written from secondary memory 106 to primary memory 104.

Figure 2:
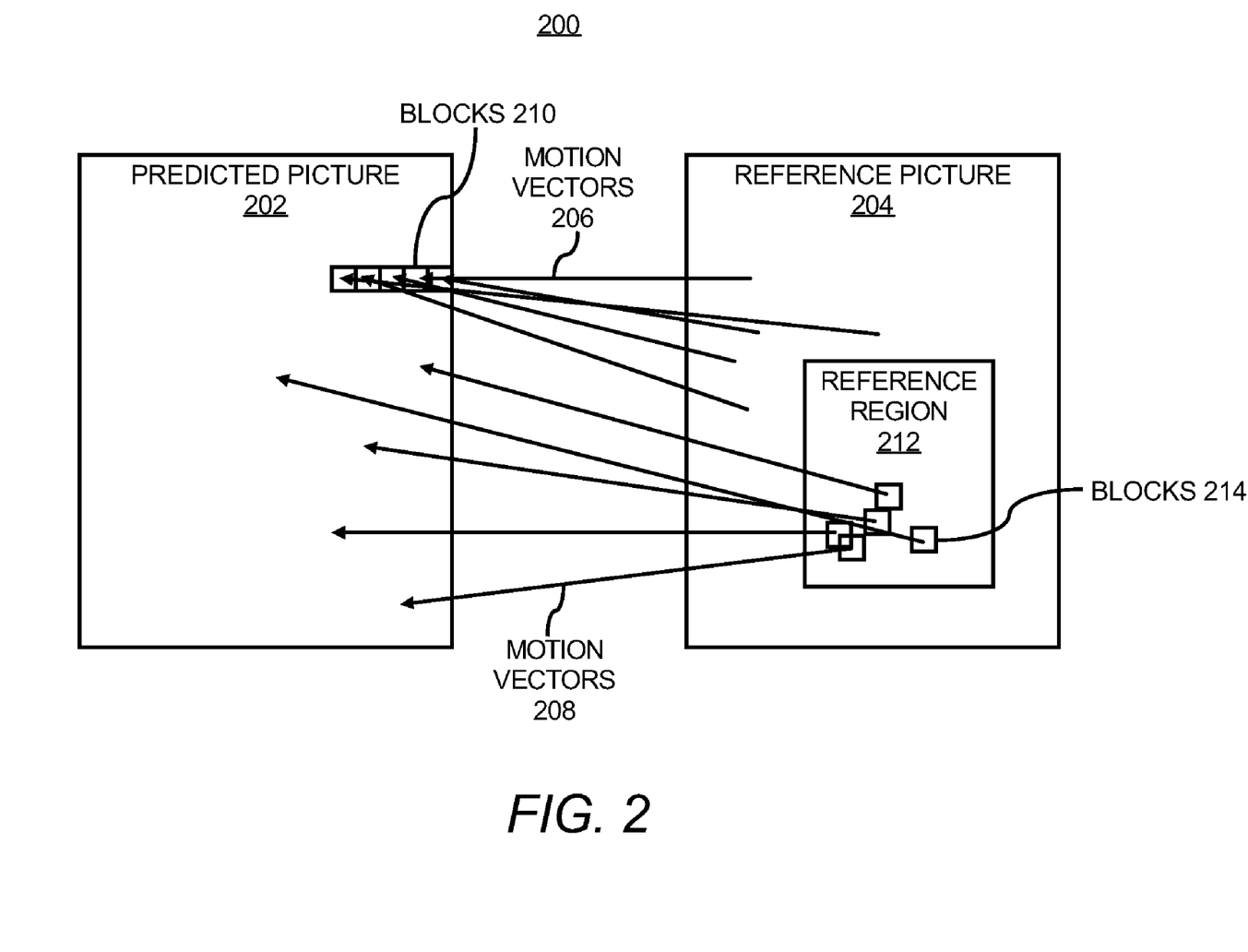
FIG. 2 illustrates a diagram 200 showing the generation of a predicted picture from a reference picture in the conventional raster scan order (i.e., from the most top left to the most top right, from the second most top left to the second most top right, from the third most top left to the third most top left, and so on and forth, from top to bottom, in this left to right manner) and a comparison with the generation of the same predicted picture in a different order than raster scan order, i.e., based on region order (instead of raster scan order), according to an embodiment of the present invention.

FIG. 2 shows motion vectors 208 for each of the blocks 214 in the reference region 107. The motion vectors point 208 to the new locations of the blocks 214 in the predicted picture 109, which are shown as blocks 215. The blocks 215 are interpolated from the blocks 214 using their corresponding motion vectors as is known in the art. However, according to an embodiment of the invention, the order of reproducing the blocks in the predicted picture 109 is different than raster scan order. Instead, it is performed region-by-region, wherein each region of the reference picture 108 is selected for reproducing blocks in the predicted picture 109 in a non-raster scan order.

Figure 3:
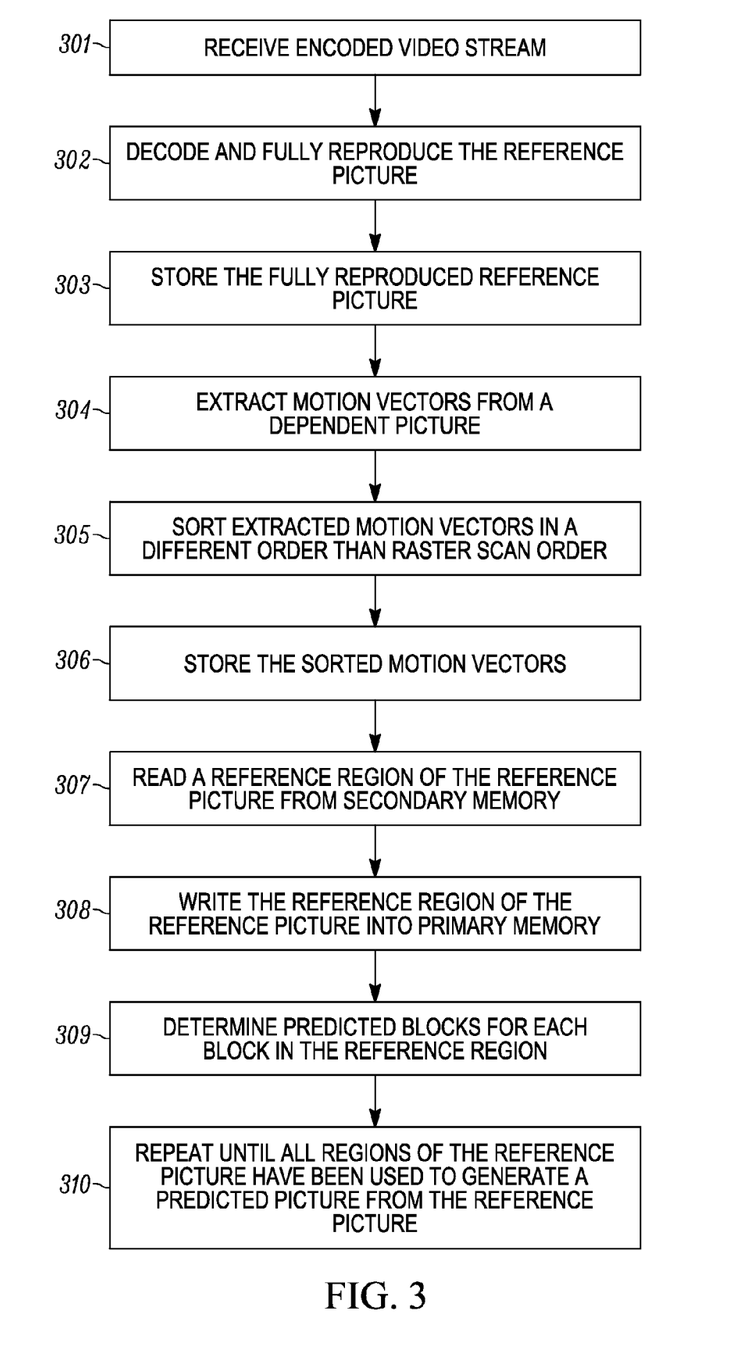
FIG. 3 illustrates a flow diagram of a method 300 for coding video in this manner by extracting motion vectors from a video stream and sorting the extracted motion vectors in the different order than raster scan order to generate (partial and/or full) predicted pictures from reference pictures (i.e., based on region order instead of raster scan order), according to an embodiment of the invention.

FIG. 3 illustrates a flow diagram of the method 300 for coding video by extracting and sorting motion vectors in a different order than raster scan order, according to an embodiment of the invention. The method 300 is described with respect to the video coding system 100 shown in FIG. 1 by way of example and not limitation.

At step 301, the video coding system 100 receives an encoded video stream. This may be an MPEG encoded stream or the stream may have been encoded using another encoding scheme.

At step 302, a reference picture, such as the reference picture 108, is decoded and is fully reproduced.

At step 303, the fully reproduced reference picture 108 is stored in the secondary memory 108.

At step 304, the video coding system 100 extracts motion vectors for an encoded dependent picture, such as the predicted picture 109 which is dependent on the reference picture 108. For example, the motion vectors are identified from the incoming video stream that are for the predicted picture 109. The motion vectors may be stored in a buffer in the order from the video stream. This may include a raster scan order. For example, a motion vector is provided for each block starting from the top left and moving horizontally across to the top right and so on for next row of blocks. The motion vectors may be ordered in the buffer corresponding to each pixel or block in raster scan order. This sorting process could occur as the reference picture is being received and demultiplexed.

At step 305, the video coding system 100 sorts the extracted motion vectors in a different order than raster scan order. The motion vector sorter 103 sorts the motion vectors according to predefined regions. For example, the reference picture 108 is 1280 by 720 pixels. All motion vectors for a region are grouped. This may include sorting the motion vectors in a buffer such that all motion vectors for a region are stored sequentially. Alternatively, this may include storing a mapping of which motion vectors correspond to each region.

At step 306, the motion vectors, which are sorted in the new order from step 305, are stored in the memory bins 110. Each memory bin stores motion vectors for a particular region of the reference picture 108.

At step 307, the video coding system 100 reads the reference region 107 of the reference picture 108 from the secondary memory 106. The reference region 107 is one region of multiple regions of the reference picture 108, and multiple blocks may be in each region. For example, a region may be multiple blocks, such as 160×160 pixels. Other sized blocks and regions may be used.

At step 308, the video coding system 100 writes the reference region 107 of the reference picture 108 into the primary memory 104.

At step 309, the video coding system 100 predicts blocks of the predicted picture 109 corresponding to blocks in the reference region 107. Predicting blocks includes determining blocks in the predicted picture from blocks in the reference picture and corresponding motion vectors. This includes reading the reference region 107 from the primary memory 104 and using the motion vectors from the corresponding memory bin for that region to determine the predicted blocks in the of the predicted picture 109 that correspond to the reference region 107 in the reference picture 108. MPEG decoding predicts blocks in a dependent picture from a reference picture using motion vectors.

At step 310, the video coding system 100 repeats the steps of the method 300 until it has processed all regions of the reference picture 108 so as to completely generate the predicted picture 109. This method may be performed for each dependent picture and each group of pictures in a received video stream.

After the predicted picture 108 is completely generated, it is in a form that allows it to be transrated. That is the predicted picture 108 may be inverse residual DCT-coded and encoded at a lower bit-rate. Specifically, during the motion vector reorder process, the coefficients are demultiplexed from the motion vectors and are stored, in either the compressed form or after processing with the inverse transform (e.g. IDCT), in memory. After the current predicted picture is complete, then the previously stored current residual frame is added or subtracted to/from the current predicted picture. This frame may be processed further or available for display or re-encoding. Note that the completely generated predicted picture 108 is not necessarily reproduced for display. Instead, it is in a form that allows it to be re-encoded at a different lower bit-rate.

The sorting of the motion vectors according to the predefined regions and the storing of the motion vectors in the corresponding memory bins can reduce the amount of primary memory needed to translate, decode or transcode a video stream. Conventionally, to decode a predicted picture, motion vectors and most of the blocks for the corresponding reference picture are stored in primary memory because multiple reads need to be performed in a short amount of time. This is because information for surrounding blocks is typically needed to reproduce a single block in the predicted picture. The predefined regions, according to the embodiments of the invention described above, may be larger than a single block, and thus all the data for a block within the region is available in the primary memory when needed. Furthermore, primary memory is conserved by moving the region data as needed into the primary memory. Furthermore, motion vectors are grouped or sorted according to each region in corresponding memory bins. Thus, all the motion vectors for a region can be quickly accessed to reproduce blocks in predicted picture.

One or more of the methods, other steps and modules described herein are operable to be implemented as computer code stored on a computer readable medium, such as memory or other data storage, and executed by processing circuitry.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims—and their equivalents—in which all terms are mean in their broadest reasonable sense unless otherwise indicated.

What is claimed is:

1. A video coding system for coding video data, the coding system comprising:
   a decoder configured to decode an encoded reference picture;
   a primary memory;
   a secondary memory configured to store the decoded reference picture;
   a logic device configured to extract motion vectors for generating a predicted picture of the reference picture, wherein the reference picture includes a plurality of predefined regions; wherein the logic device comprises a motion vector extractor configured to extract the motion vectors from a received video stream and wherein the logic device further comprises a motion vector sorter configured to sort the extracted motion vectors from a raster scan order to a different order corresponding to the plurality of predefined regions;

the logic device further configured to store the sorted extracted motion vectors in memory bins, wherein each memory bin stores motion vectors for a particular region of the plurality of predefined regions; and for each of the plurality of predefined regions of the reference picture, the logic device is configured to use the memory bin corresponding to a reference region to read the reference region from the secondary memory and write the reference region into the primary memory, and use the written reference region and the motion vectors of the corresponding memory bin to spatially translate the written reference region into the predicted picture.

2. The video coding system according to claim 1, wherein the secondary memory is slower memory than the primary memory.

3. The video coding system according to claim 1, wherein the secondary memory is less expensive memory than the primary memory.

4. The video coding system according to claim 1, wherein the logic device is at least one of a digital signal processor, an ASIC, and a field programmable array.

5. The coding system according to claim 1, wherein each of the plurality of predefined regions are larger than a block.

6. The coding system according to claim 1, further comprising:

an encoder configured to obtain the predicted picture and operable to encode the predicted picture at a lower bit-rate than a constant bit-rate.

7. A method for coding video data, the method comprising:
decoding an encoded reference picture;
storing the decoded reference picture in a secondary memory;
extracting motion vectors for generating a predicted picture of the reference picture, wherein the reference picture includes a plurality of predefined regions;
sorting the extracted motion vectors from a raster scan order to a different order corresponding to the plurality of predefined regions;
storing the sorted extracted motion vectors in memory bins, wherein each memory bin stores motion vectors for a particular region of the plurality of predefined regions; and
for each of the plurality of predefined regions of the reference picture:
using a memory bin corresponding to a reference region to read the reference region from the secondary memory and write the reference region to a primary memory; and
using the written reference region and the motion vectors of the corresponding memory bin to spatially translate the written reference region into the predicted picture.

8. The method according to claim 7, wherein the secondary memory is slower memory than the primary memory.

9. The method according to claim 7, wherein the secondary memory is less expensive memory than the primary memory.

10. The method according to claim 7, further comprising:
extracting motion vectors from a received video stream to generate the predicted picture.

11. The method according to claim 7, further comprising:
encoding the predicted picture at a bit-rate lower than a constant bit-rate.

12. The method according to claim 7, wherein the predefined regions are each larger than a block.

13. The method according to claim 7, further comprising:
storing the predicted video data in memory other than the primary memory.

14. At least one non-transitory computer readable storage medium on which is embedded one or more computer programs, said one or more computer programs implementing a method for coding video, said one or more computer programs comprising computer readable code for:
decoding an encoded reference picture;
storing the decoded reference picture in a secondary memory;
extracting motion vectors for generating a predicted picture of the reference picture, wherein the reference picture includes a plurality of predefined regions;
sorting the extracted motion vectors from a raster scan order to a different order corresponding to the plurality of predefined regions;
storing the sorted extracted motion vectors in memory bins, wherein each memory bin stores motion vectors for a particular region of the plurality of predefined regions; and
for each of the plurality of predefined regions of the reference picture,
identifying a memory bin corresponding to a reference region;
writing the reference region from the secondary memory to a primary memory; and
using the reference region in the primary memory and the motion vectors from the corresponding memory bin to spatially translate the written reference region into the predicted picture.

15. The computer readable medium according to claim 14, wherein the secondary memory is slower memory than the primary memory.

16. The computer readable medium according to claim 14, wherein the secondary memory is less expensive memory than the primary memory.

* * * * *